United States Patent
Konaka et al.

(10) Patent No.: US 6,772,353 B2
(45) Date of Patent: Aug. 3, 2004

(54) COMPUTER INTERFACE ARCHITECTURE HAVING A POWER SAVING FUNCTION

(75) Inventors: Yosuke Konaka, Ebina (JP); Yoshiaki Nomura, Ebina (JP); Shigeharu Koyanagi, Sagamihara (JP); Nobuhiro Kato, Ebina (JP)

(73) Assignee: Hitachi, Ltd., Tokyo (JP)

( * ) Notice: Subject to any disclaimer, the term of this patent is extended or adjusted under 35 U.S.C. 154(b) by 178 days.

(21) Appl. No.: 09/860,586

(22) Filed: May 21, 2001

(65) Prior Publication Data

US 2001/0021981 A1 Sep. 13, 2001

Related U.S. Application Data

(62) Division of application No. 09/455,364, filed on Dec. 6, 1999, which is a continuation of application No. 08/958,527, filed on Oct. 27, 1997, now Pat. No. 6,055,641.

(30) Foreign Application Priority Data

Oct. 29, 1996 (JP) .............................................. 8-286216

(51) Int. Cl.⁷ .............................. G06F 1/30; G06F 1/26
(52) U.S. Cl. ...................................... 713/300; 713/324
(58) Field of Search ................................. 713/300, 310, 713/323, 324, 330, 320

(56) References Cited

U.S. PATENT DOCUMENTS

| | | | |
|---|---|---|---|
| 4,707,848 A | * 11/1987 | Durston et al. | ............ 379/1.01 |
| 5,644,569 A | 7/1997 | Walker | |
| 5,692,197 A | 11/1997 | Narad et al. | |
| 5,721,934 A | * 2/1998 | Scheurich | ................... 713/320 |
| 5,752,050 A | 5/1998 | Hermandez et al. | |
| 5,799,198 A | 8/1998 | Fung | |
| 5,835,719 A | 11/1998 | Gibson et al. | |
| 5,842,002 A | 11/1998 | Schnurer et al. | |
| 5,870,458 A | * 2/1999 | Pappas et al. | ........... 379/93.11 |

FOREIGN PATENT DOCUMENTS

JP          61-173568          8/1986

* cited by examiner

Primary Examiner—Tim Vo
(74) Attorney, Agent, or Firm—Mattingly, Stanger & Malur, P.C.

(57) ABSTRACT

An information processing apparatus such as a personal computer is capable of controlling consumption power of a digital communication line interface circuit or a modem depending on a usage state of the communication line. In one aspect, the information processing apparatus including a digital communication interface circuit connected to a digital line to communicate data, includes a link state detect circuit to ascertain a link state between the interface circuit and the communication line and a consumption power mode change circuit to change a consumption power mode change circuit to change a consumption power mode of the interface circuit depending on the link state ascertained by the detect circuit.

4 Claims, 7 Drawing Sheets

COMPUTER INTERFACE ARCHITECTURE HAVING A POWER SAVING FUNCTION

This is a divisional application of U.S. Ser. No. 09/455,364, filed Dec. 6, 1999, which is a continuation application of U.S. Ser. No. 08/958,527, filed Oct. 27, 1997, now U.S. Pat. No. 6,055,641.

BACKGROUND OF THE INVENTION

The present invention relates to an information processing apparatus to be connected to a digital communication line to communicate data, and in particular, to a technology effective to control the life of batteries in a battery-driven hand-held information processing apparatus including a digital communication line inter ace circuit to be connected to a network such as a local area network to communicate data.

In use of conventional information processing apparatuses or processors, a plurality of information processors are connected to a network such that various data items are communicated between the plural information processors.

The information processor connected to the network to communicate data as above includes a digital communication line interface circuit to be connected to the digital communication line.

For the interface above, there exists recently a tendency that the transfer speed is considerably improved and the power consumption is conspicuously increased due to the direct connection to a high-speed bus.

Presently, when a digital communication line interface circuit is installed in a battery-driven hand-held information processor, the ratio of power consumption of the interface circuit takes quite a large value in the overall power consumption of the information processor.

In the case of the battery-driven information processor, the digital communication interface circuit is used primarily in an office environment and, hence, when the apparatus is being carried about and is driven by batteries, the interface circuit is not connected to a digital communication line such as a network in many cases. Therefore, in general, when the information processor is being carried about, the interface circuit is not used.

Consequently, when the battery-driven information processor is being carried about and is driven by batteries, it can be considered to elongate the battery drive time by stopping the interface circuit not used. However, in the conventional information processor, to stop only the line interface circuit when the line is not used, there arises a difficulty. Namely, it is necessary to provide a sleep signal and a circuit or the like to relate the signal to a link signal.

On the other hand, in JP-A-61-173578, there has been described a communication start/end scheme for use with an apparatus in which a telephone line is shared between a telephone set and a data terminal, the method remarkably lower power consumption of the apparatus and simplifying the function to identify a call termination and the function to monitor the end of call.

According to the apparatus of JP-A-61-173568, a logic to distinguish a telephone call from a data communication and a logic to monitor the end of call are disposed in a read-only memory (ROM), and the apparatus is entirely powered at call termination such that the start or end of call is awaited according to the logic in association with activation of the ROM to interrupt power, only excepting the line interface section, so as to set the apparatus to a standby state.

The present inventors have considered the prior art, and have found the following problems.

That is, in the conventional information processor, since it is difficult to stop only the digital communication line interface circuit when the digital communication line is not used, there has been a problem that the power consumption of the interface circuit cannot be minimized even when the information processor is used for a purpose other than for digital communication.

Furthermore, when the conventional information processor is driven by batteries, the interface circuit continuously consumes a large amount of power even when the digital communication line is not used, which raises a problem of a short battery life and a minimized battery drive time.

Additionally, in the conventional information processor, even when the digital communication line is not used, the digital communication line interface circuit continuously uses the hardware resource to establish an interruption signal, an address space, and the like, which therefore results in a problem of restriction in expandability of the information processor.

On the other hand, in the conventional communication start/end method of JP-A-61-173568, there are effected reduction of power consumption of the processor when externally accessing a host via a telephone line, and simplification of the function to identify a call termination and the function to monitor the end of call, which leads to a problem that power cannot be turned on or off in response to an access from the host side.

SUMMARY OF THE INVENTION

It is therefore an object of the present invention to provide a hand-held information processing apparatus capable of controlling power consumption of the digital communication line interface circuit in accordance with a utilization state of the digital communication line.

Another object of the present invention is to provide an information processing apparatus capable of controlling power consumption of the digital communication line interface circuit in accordance with a change in the state of other information processing apparatus on the network.

Another object of the present invention is to provide an information processing apparatus capable of controlling power consumption of the digital communication line interface circuit not including a power source line and a sleep mode signal line.

Another object of the present invention is to provide a technology capable of efficiently using resources of the information processing apparatus.

The above and other objects and novel features of the present invention will be clarified through description and accompanying drawings of this specification.

Of the present invention disclosed by this application, an outline of representative aspects will be briefly described herebelow.

(1) An information processing apparatus including a digital communication line interface circuit to be connected to a digital communication line to communicate data includes means to change a consumption power mode of the interface circuit in accordance with a link state with respect to the communication line.

In the information processing apparatus, when a particular link state confirmation request (reference numeral 301 or 211 herebelow) is issued, a link state detect circuit checks to determine whether a link is already established between the interface circuit and the communication line.

In this regard, the confirmation request is issued in response to a transition of a power management mode, an input of a line confirmation request by an operator, a power-on operation, a detection of a reception signal at a particular level, an operation to attach or to remove a network cable, or a change in the power source supply method.

If the link has been established between the interface circuit and the communication line, the consumption power mode change circuit keeps the supply of power to the interface circuit.

If the link has not been established between the interface circuit and the communication line, the consumption power mode change circuit changes the mode of the power supply to the interface circuit to the low consumption power mode.

In this situation, the meaning of the consumption power mode to be changed by the mode change circuit varies depending on the type of the signal line included in the interface circuit. For example, when the interface circuit includes only a power source line, the consumption power mode can be changed by the power-on or power-off operation.

Furthermore, when there is disposed a sleep mode signal line to change the mode of the interface circuit to the sleep mode, the consumption power mode can be changed in accordance with the sleep mode.

As above, in accordance with the information processing apparatus, since the power consumption of the digital communication line interface circuit is minimized when there is not established a link with the digital communication line, it is possible to control the power consumption of the line interface circuit in accordance with the utilization state of the digital communication line.

(2) The information processing apparatus described in the aspect (1) above includes means (e.g., a circuit 300 of FIG. 3) to confirm the link state with the digital communication line in response to detection of a change in the particular reception signal level (exceeding a threshold).

In the information processing apparatus, the reception signal level detector circuit checks the signal level of the reception signal received by the interface circuit to thereby conduct a monitor operation to determine whether or not a signal having a particular amplitude is being transmitted through the digital communication line.

When a transmission of the signal having the particular amplitude is started through the communication line or a transmission of the signal having the particular amplitude conducted through the communication line is stopped, the link state detect circuit confirms the link state with respect to the communication line.

If the information processing apparatus has been connected via an inter-network apparatus such as a hub, a bridge, a router, or a local area network (LAN) switch to a network, the state of the link between the information processing apparatus and the communication line is changed when the power of the inter-network apparatus is turned on or off.

In this case, the reception signal level detector circuit of the information processing apparatus detects, in accordance with the change in the reception signal level, that the power of the inter-network apparatus installed between the network and the information processing apparatus is turned on or off, and then issues a link state confirmation request to thereby change the consumption power mode.

As above, in accordance with the information processing apparatus, since the link state is confirmed at detection of the reception signal at a particular level on the digital communication line, the power consumption of the interface circuit can be controlled corresponding to a change in the state of other processing apparatus on the network.

(3) The information processing apparatus described in the aspect (1) or (2) includes means for changing the consumption power mode by keeping the reset signal.

When changing the consumption power mode of the interface circuit in the information processing apparatus, the reset signal is held or is released by the reset signal hold circuit to change the consumption power made of the interface circuit.

When a reset signal is inputted to the interface circuit, the internal state of the interface circuit is initialized, namely, the interface circuit is set to a state in which the interface circuit does not operate while the reset signal is being inputted thereto.

Therefore, when the state in which the reset signal is being inputted is held in the interface circuit, the state in which the interface circuit does not operate is held, which establishes the state of the low consumption cower mode.

As above, in accordance with the information processing apparatus, since the consumption power is controlled by the reset signal, it is possible to control the consumption power of the digital communication line interface circuit having no power source line or sleep mode signal line.

(4) The information processing apparatus in accordance with the aspect (1), (2), or (3) includes means for changing the resource allocation when the consumption power mode is changed.

In the information processing apparatus, when the consumption power mode of the interface circuit is changed by the consumption power mode change circuit, the allocation of resources allocated to the interface circuit is changed by a resource allocation controller.

In the information processing apparatus, when the operation of the interface circuit is stopped due to occurrence of a particular link state confirmation request, an interruption signal and an I/O address employed by the interface circuit are set to an unused state.

Consequently, when starting the operation of another circuit by the consumption power mode change circuit, the interruption signal and the I/O address in the unused state can be allocated to the circuit for the operation.

For example, if the resources allocated to the interface circuit are allocated to the pertinent circuit for the operation, the resources can be deallocated and allocated to the circuit and the interface circuit by alternatively activating operation of the circuit and the interface circuit by the resource allocation controller.

As above, in accordance with the information processing apparatus, since the resource allocation is changed when the consumption power mode is changed, the resources of the information processing apparatus can be efficiently utilized.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Subsequently, description will be given of an embodiment of the information processing apparatus or information processor in accordance with the present invention, in which the link state is confirmed in response to a particular link state confirmation request, and a power source line of the digital communication line interface circuit is controlled in accordance with the confirmed link state to thereby change the consumption power mode.

Figure 1A:
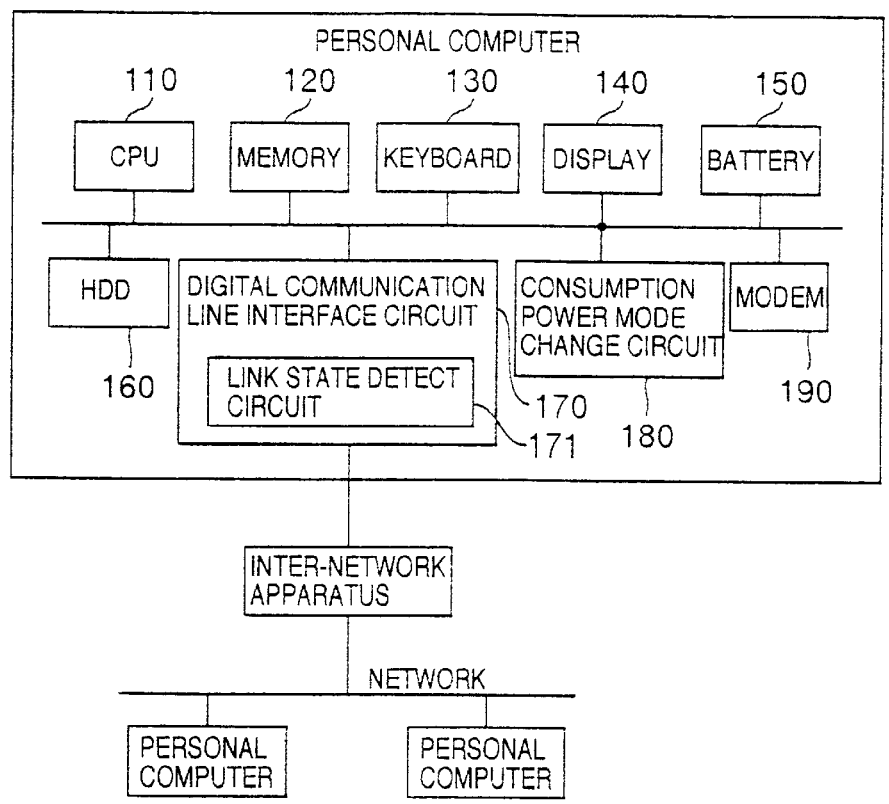
FIG. 1A is a diagram showing a general configuration of an embodiment of an information processing apparatus of the present invention.

FIG. 1A is a diagram showing a general configuration of an embodiment of the information processor. In FIG. 1A, 110 indicates a central processing unit (PCU), 120 is a memory, 130 denotes a keyboard, 140 indicates a display, 150 is a battery, 160 denotes a hard disk drive )HDD), 170 indicates a digital communication line interface circuit, 180 is a consumption power mode change circuit, and 190 denotes a modem.

As shown in FIG. 1A, the information processor of this embodiment includes a CPU 110, a memory 120, a keyboard 130, a display 140, a battery 150, an HDD 160, a digital communication line interface circuit 170, a link state detect circuit 171, a consumption cower mode change circuit 180, and a modem 190.

Additionally, as shown in FIG. 1A, in the information processor above, there are connected to each other the CPU 110 to control the overall processor, the memory to a communication program and the like, the keyboard 130 to input a link state confirmation request and the like, the display 140 to display a setting menu in which the link state confirmation request and the link are to be inputted, the battery 150 to supply power to the processor when the processor is being carried about, the HDD 160 to store therein a communication program and the like, the interface circuit 170 to connect the processor to a network, the mode change circuit 180 to control the consumption power of the interface circuit 170, and the modem 190 to establish connection to an analog line.

The interface circuit 170 is an interface circuit to connect the processor to a network of a digital communication line such as an LAN, i.e., a circuit to communicate data with another personal computer on the network.

The interface circuit 170 includes the link state detect circuit 171 which confirms whether or not a link is established between the interface circuit 170 and the network, to output a link establishing signal to the mode change circuit 180.

The link state detect circuit 171 of the interface circuit 170 sends a particular packet to the network, for example, in a power-on self-test when the processor is powered. Receiving an acknowledge (ACK) signal in response thereto, the circuit 171 confirms whether or not a link has been established between the interface circuit 170 and the network.

The mode change circuit 180 is a circuit to change the consumption power mode of the interface circuit 170, i.e., a facility which operates in association with the consumption power mode provided in the interface circuit 170 to cause a transition of the state to a power-off state, a sleep-mode state, a state in which some of the circuits are powered, or a power-on state.

In this connection, the power-off state of the interface circuit indicates a state in which the power to all circuits of the interface circuit 170 is turned off, and the sleep-mode state denotes a state in which the power to circuits other than a circuit which issues an ACK signal at reception of a signal in the interface Additionally, the state in which some of the circuits are powered indicates a state in which circuits other than those powered in the sleep mode are partly powered, and the power-on state is a state in which all circuits of the interface circuit 170 are powered.

The meaning of the consumption power mode which can be changed by the mode change circuit 180 varies depending on the type of signal line disposed in the interface circuit 170. For example, when the interface circuit 170 includes only the power source line, the consumption power mode can be changed only when the power is turned on or off. Furthermore, when the interface circuit 170 includes a transition enable signal line, the consumption power mode can be changed in relation to the sleep mode.

Figure 1B:
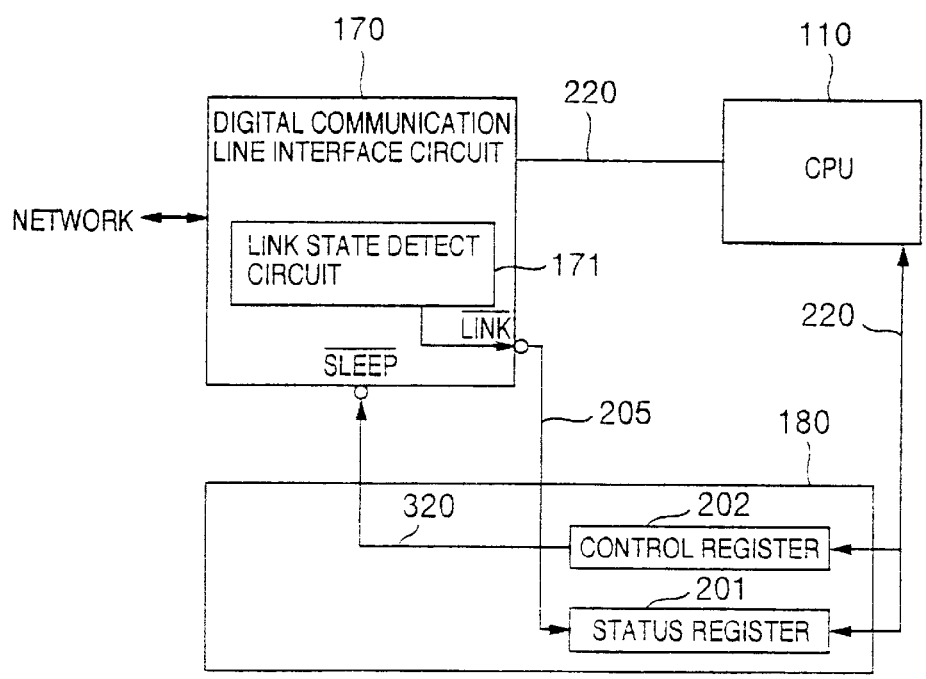
FIG. 1B is a block diagram showing a detailed circuit example of a primary section of the information processing apparatus shown in FIG. 1A.

FIG. 1B shows the primary circuit of a power source control section of the computer of FIG. 1A. The circuit includes a sleep mode transition enable signal line 320, interface circuit 170 including a link signal output terminal LINK, mode change circuit 180 including a control register 202 and a status register 201, and CPU 110. The circuit operation thereof will be described later by referring to FIG. 3.

Furthermore, in the information processor of the embodiment, when it is attempted by the mode change circuit 180 to change the consumption power mode in a case in which neither a power source line nor a sleep mode transition enable signal line is provided, the consumption power mode is changed by using another signal line.

Figure 2:
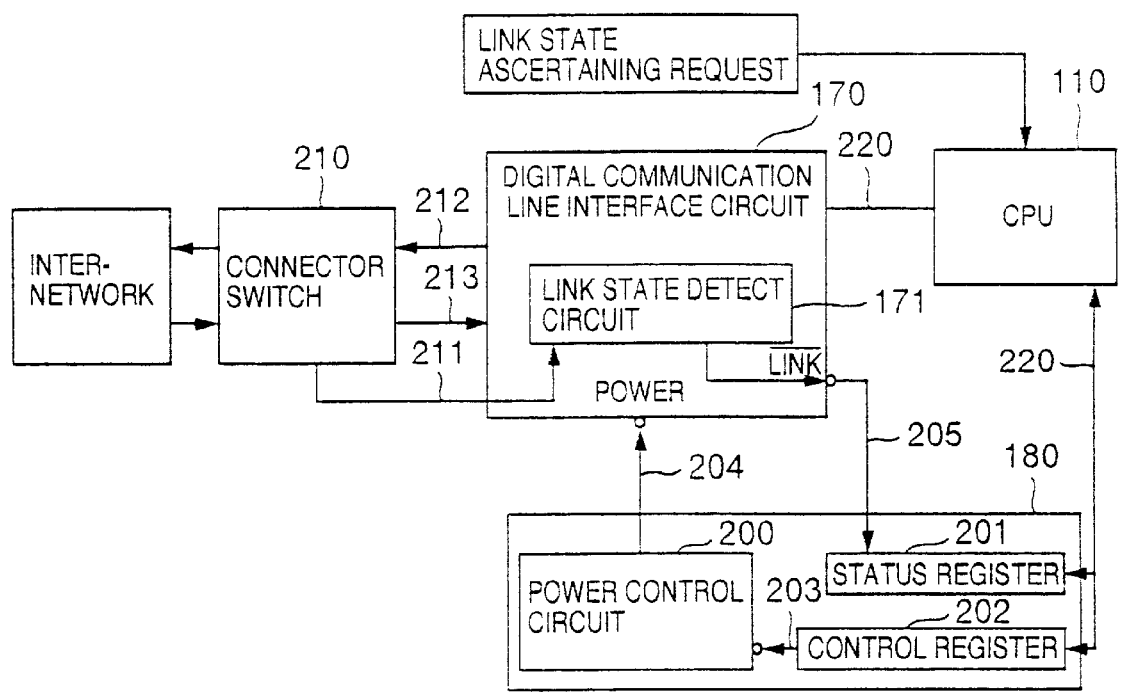
FIG. 2 is a diagram showing an outline of an operation of changing the consumption power mode of a digital communication line interface circuit 170 in response to a confirmation request for a link state of the information processing apparatus of the embodiment.

FIG. 2 shows another embodiment of the information processor of FIGS. 1A and 1B. In this embodiment, the link state is confirmed in response to a particular link state confirmation request and the power source line of the interface circuit 170 is controlled in accordance with the confirmed link state to thereby change the consumption power mode.

FIG. 2 shows an outline of an operation to change the consumption power mode of the interface circuit 170 in accordance with a confirmation request for the link state of the information processor of the embodiment. In FIG. 2, 200 indicates a power source control circuit, 201 is a status register, 202 denotes a control register, 203 indicates a power on enable signal line, 204 is a power source line, 205 denotes a line establishing signal line, 210 is a connector switch, 211 denotes a connector connection signal line, 212 denotes a transmission-side communication line, 213 indicates a reception-side communication line, and 220 is an interface bus.

As shown in FIG. 2, in the operation to change the consumption power mode of the interface circuit 170 in accordance with the line state confirmation request, there are used the power source control circuit 200, the status register 201, the control register 202, the power on enable signal line 203, the power source line 204, the link establishing signal line 205, the connector switch 210, the connector connection signal line 211, the transmission-side communication line 212, the reception side communication line 213, and the interface bus 220. In the operation to change the consumption power mode, when a particular link state confirmation request is issued, the link state is confirmed by the link state detect circuit 171, and the power source signal of the power source line 204 is controlled in accordance with the confirmed link state to change the consumption power mode of the interface circuit 170.

The power control circuit 200 of the mode change circuit 180 outputs a particular power source signal from the power source line 204 depending on the value of the power on enable signal sent from the control register 202 via the power on enable signal line 203 to control operation of turning the power of the interface circuit 170 on or off.

The status register 201 stores therein the value of the link establishing signal sent from the link state detect circuit 171 via the link establishing signal line 205. The control register 202 stores therein control information to the power control circuit 200 sent from the CPU 110 via the interface bus 220.

The connector switch 210 detects whether or not a network cable connecting the interface circuit 170 to the network is linked with a connector and notifies the link state of the connector via the connector connection signal line 211 to the interface circuit 170.

In the information processor of the embodiment, the link state confirmation request to the link state detect circuit 171 for confirmation of the link state is issued at occurrence of any one of the following events: a transition of power management mode, an input of a link confirmation request from the operator, a power-on operation, a detection of a reception signal at a particular level, attachment or release of the network cable, or a change in the power supply method. In this connection, the transition of power management mode causing the confirmation request indicates a transition between power management modes controlled in the overall information processor, namely, a plurality of states including the power-off state, the suspended mode state, the sleep mode state, and the power-on state. The power-off state of the overall information processor indicates a state in which the power to all circuits of the information processor is off, and the suspended mode state denotes a state in which only the contents of the memory 120 are saved. The sleep mode state is a state in which the CPU 110, the memory 120, the interface circuit 170, and the like are operating and the back light and the display 140 are off, and the power-on state indicates state in which all circuits are powered.

The input of the link confirmation request by the operator to cause the link state confirmation request indicates a request from the keyboard 130 mounted on the information processor by the operator of to change the consumption power mode, the request being inputted to the CPU 110.

In the information processor of the present embodiment, the detection of a reception signal of a particular level causing the reconfirmation request indicates a state in which a signal having a particular amplitude is detected on the reception-side communication line 213. The attachment and release of the network cable causing the reconfirmation request indicates a state in which there is detected by the connector switch 210 connection/disconnection (attachment/release) of the network cable to the interface circuit 170. The change in the power supply method causing the reconfirmation request indicates a state in which the method of supplying power to the overall information processor is changed, for example, the power source is changed to an alternating-current (AC) power source 150.

In operation of the information processor of the present embodiment, when a link state confirmation request described above is first issued, the CPU 110 changes via the control register 202 the power on enable signal line 203 to a power on enable state in the power supply control circuit 200 of the consumption power mode change circuit 180, and keeps the state for a fixed period of time.

Since the signal line 203 is in the power on enable state, the control circuit 200 of the change circuit 180 supplies power via the power supply line 204 to the interface circuit 170.

Receiving power via the power supply line 204, the interface circuit 170 activates the link state detect circuit 171 after an internal initialization is completed.

The link state detect circuit 171 of the interface circuit 170 starts confirming via the transmission-side and reception-side communication lines 212 and 213 whether or not a link state can be established in the network.

When it is confirmed that a link is established in the network, the link state detect circuit 171 of the interface circuit 170 issues a link establishing signal via the link establishing signal line 205 to the status register 201.

The CPU 110 executes for a fixed period of time an operation of polling the status of the link establishing signal line 205 of the status register 201 to check whether or not the link establishing operation can be confirmed by the status register 201 within the fixed period of time.

If the link establishing operation is confirmed by the status register 201 within the fixed period of time as a result of the execution of the operation for the fixed period of time to poll the status of the link establishing signal line 205 of the status register 201, the CPU 110 keeps the contents of the control register 202 to hold the power on enable signal line 203 in the power on enable state in the control circuit 200 of the mode change circuit 180.

If the link establishing operation is not confirmed by the status register 201 within the fixed period of time in the polling operation of the fixed period of time, the CPU 110 assumes that the connection is not established to the network and changes the contents of the control register 202 to change the power on enable signal line 203 to the power-off state in the control circuit 200 of the mode change circuit 180.

When the signal line 203 is changed to the power-off state, the control circuit 200 of the mode change circuit 180 stops supplying power to the power supply line 204 to turn power of the interface circuit 170 off.

As described above, in accordance with the information processor of the embodiment, when there is not established a link to the digital communication line, the power consumption of the digital communication interface circuit is minimized and hence it is possible to control the power consumption of the interface circuit in accordance with the utilization state of the digital communication line.

Figure 3:
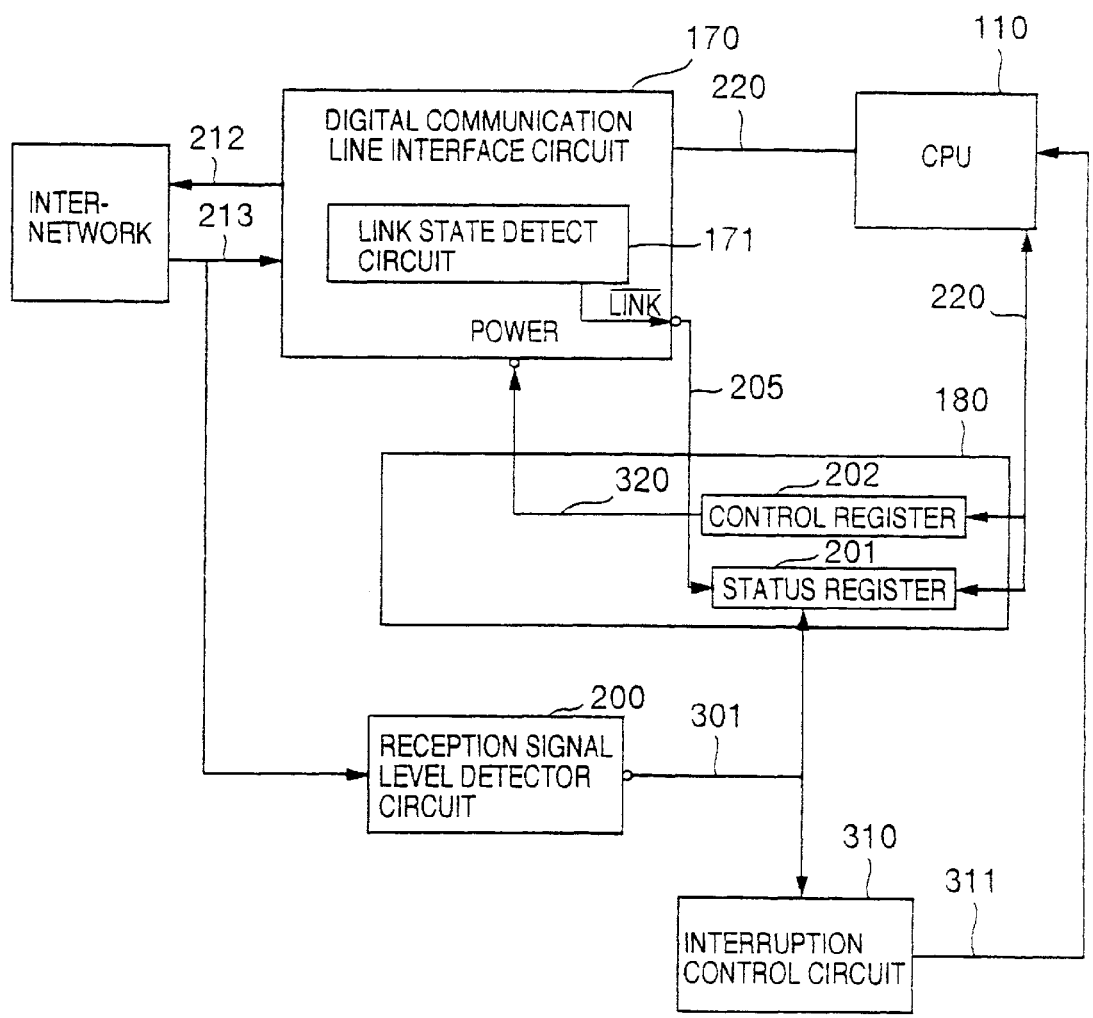
FIG. 3 is a diagram showing an outline of an operation of changing the consumption power mode of the digital communication line interface circuit 170 in accordance with a reception signal level of the information processing apparatus of another embodiment.

FIG. 3 shows another embodiment of the information processor of FIGS. 1A and 1B. In this embodiment, the link state is confirmed by detecting a reception signal at a particular signal level such that the sleep mode transition enable signal line of the digital communication interface circuit is controlled in accordance with the confirmed link state to thereby change the consumption power mode.

FIG. 3 is a diagram showing an outline of the operation to change the consumption power mode of the interface circuit 170 in accordance with the reception signal level of the information processor of the present embodiment. In FIG. 3, 300 indicates a reception signal level detector circuit, 301 is a reception signal detection signal line, 310 denotes an interruption control circuit, 311 indicates a system management interruption signal line, and 320 is a sleep mode transition enable signal line.

As shown in FIG. 3, in the operation to change the consumption power mode of the interface circuit 170 in accordance with the reception signal level, there are utilized the detector circuit 300, the detection signal line 301, the interruption control circuit 310, the system management interruption signal line 311, and the transition enable signal line 320. In such a mode change operation, when a reception signal at a particular signal level is detected, the link state is confirmed by the link state detect circuit 171 and the sleep mode transition enable signal of the enable signal line 320 is controlled in accordance with the confirmed link state to thereby change the consumption power mode of the interface circuit 170.

Even when the network cable is connected to the interface circuit 170 and a link is once established between the network and the interface circuit 170, if an inter-network facility such as a hub, a bridge, a router, or an LAN switch is installed between the interface circuit 170 and the network, the state of the link between the interface circuit 170 and the network is changed by turning the power of the inter-network facility on or off.

The reception signal level detector circuit 300 detects in accordance with a change in the reception signal level on the reception-side communication line 213 that the power of the inter-network facility installed between the interface circuit 170 and the network has been turned on or off and then issues a link state confirmation request. The detector circuit 300 is a circuit which confirms a voltage level of the communication line 213 to thereby detect a transmission signal flowing through the network. As the circuit 300, there may be adopted a low-pass filter or a differential comparator in association with the digital communication line used in the network.

In operation, when a reception signal at a particular voltage level is detected on the reception-side communication line 213, the reception signal level detector circuit 300 outputs a detection signal corresponding to the detected reception signal via the reception signal detection signal line 301 to the status register 201. Confirming the detection signal output in the status register 201, the CPU 110 controls for a fixed period of time via the control register 202 the sleep mode transition enable signal of the enable signal line 320 of the mode change circuit 180 to cause a transition to the power on enable state. In this situation, when the confirmation by the status register 201 is difficult, for example, when the detection signal of the signal line 301 outputted from the detector circuit 300 has a short pulse width, the signal line 301 may be connected to the interruption control circuit 310 such that an interruption is issued to the CPU 110 via the system management interruption signal line 311.

When there is conducted a transition to the power on enable state by the sleep mode transition enable signal on the enable signal line 320, the interface circuit 170 activates the link state detect circuit 171 after the internal initialization is completed. The detect circuit 171 of the interface circuit 170 starts confirming via the transmission-side and reception-side communication lines 212 and 213 whether or not a link state can be established in the network. When the link establishing is confirmed in the network, the link state detect circuit 171 issues a link establishing signal via the link establishing signal line 205 to the status register 201.

The CPU 110 executes for a fixed period of time an operation to poll the status of the signal line 205 in the status register 201 to investigate whether or not the link establishing can be confirmed by the status register 201 within the fixed period of time. When the link establishing is confirmed by the status register 201 within the fixed period of time as result of the execution of polling, the CPU 110 keeps the contents of the control register 202 to hold the sleep mode transition enable signal of the signal line 320 of the mode change circuit in the power on enable state.

In the polling operation of the fixed period of time, when the link establishing is not confirmed by the status register 201 within the fixed period of time, the CPU 110 assumes that the network is not connected and changes the contents of the control register 202 to thereby change the sleep mode transition enable signal of the signal line 320 of the change circuit 180 to the sleep mode state.

When the transition enable signal of the signal line 320 of the change circuit 180 is changed to the sleep mode state, the interface circuit 170 is set to the sleep mode.

As described above, in accordance with the embodiment of FIG. 3, since the link state is confirmed when a reception signal at a particular level is detected on the digital communication line, the power consumption of the interface circuit can be controlled in accordance with the change in the state of other processors on the network.

Figure 4:
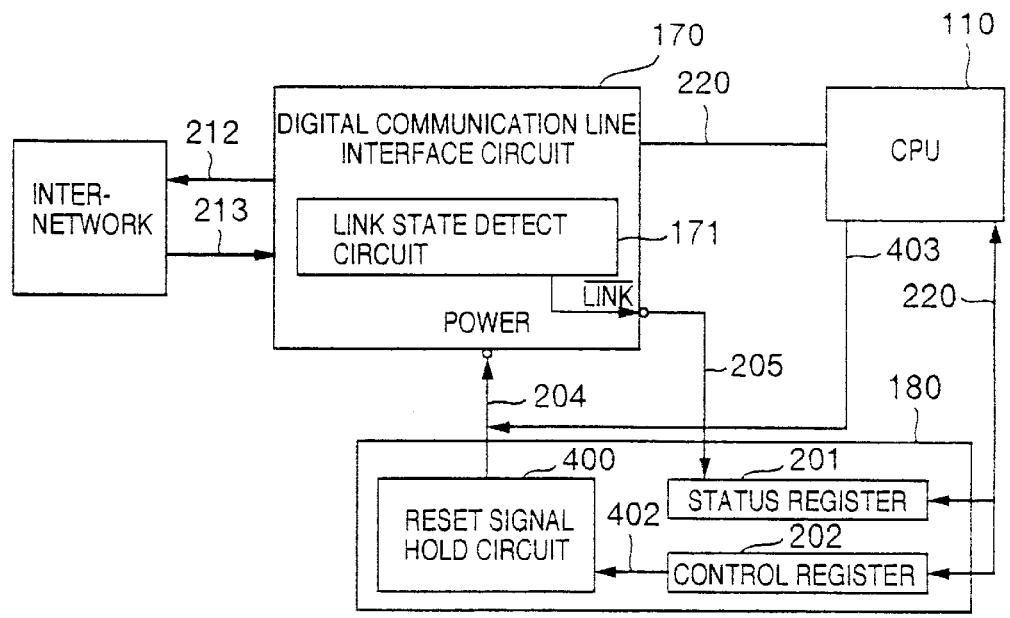
FIG. 4 is a diagram showing an outline of an operation of changing the consumption power mode of the digital communication line interface circuit 170 in accordance with a reception signal level of the information processing apparatus of another embodiment.

Referring now to FIG. 4, description will be given of an embodiment of the information processor of the present invention in which the consumption power mode thereof is changed by holding the reset signal of the digital communication line interface circuit.

FIG. 4 shows an outline of an operation to change the consumption power mode of the interface circuit 170 in accordance with the reset signal of the information processor. In FIG. 4, 400 indicates a reset signal hold circuit, 401 is a reset signal line, 402 denotes a consumption power mode change enable signal line, and 403 indicates a processor reset signal line.

As shown in FIG. 4, in the operation to change the consumption power mode of the interface circuit 170 in accordance with the reset signal of the information processor, there are used the hold circuit 400, the reset signal line 401, the change enable signal line 402, and the reset signal line 403. In the change operation, when a particular line state confirmation request is issued, the link state is confirmed by the link state detect circuit 171 and the reset signal of the signal line 401 is controlled in accordance with the confirmed link state to thereby change the consumption power mode of the interface circuit 170.

The reset signal hold circuit 400 of the mode change circuit 180 outputs the reset signal via the signal line 401 in accordance with the value of the consumption power mode change enable signal sent from the control register 202 via the enable signal line 402 to hold the reset signal previously outputted so as to control the consumption power of the interface circuit 170.

In operation, when a particular link state confirmation request is issued, the CPU 110 changes via the control register 202 the enable signal line 402 in the hold circuit 400 of the mode change circuit 180 to the power-on enable state and keeps the state for a fixed period of time. Since the enable signal line 402 is set to the power-on enable state, the reset signal hold circuit 400 releases the reset hold state of the interface circuit 170 via the reset signal line 401. Receiving the signal to release the reset hold state via the signal line 401, the interface circuit 170 activates the link state detect circuit 171 after the internal initialization is completed.

The detect circuit 171 starts confirming by use of the transmission-side and reception-side communication lines 212 and 213 whether or not a link state can be established in the network. When the link establishing event is confirmed in the network, the detect circuit issues a link establishing signal via the link establishing signal line 205 to the status register 201.

The CPU 110 executes for a fixed period of time an operation to poll the status on the signal line 205 of the status register 201 to check whether or not the link establishing event is confirmed by the status register 201 within the fixed period of time. When the link establishing event is confirmed by the status register 201 within the fixed period of time as a result of the operation to poll the status on the signal line 205 of the status register 201 for the fixed period of time, the CPU 110 keeps the contents of the control register 202 to thereby hold the enable signal line 402 of the reset signal hold circuit 400 of the mode change circuit in the power-on enable state.

When the link establishing event is not confirmed by the status register 201 within the fixed period of time in the polling operation for the fixed period of time, the CPU 110 assumes that the network is not connected and changes the contents of the control register 202 to change the mode change enable signal line 402 of the hold circuit 400 of the mode change circuit 180 to the reset hold state. When the signal line 402 is set to the reset hold state, the hold circuit 400 of the change circuit 180 outputs and holds a reset signal on the reset signal line 401 to thereby keep the interface circuit 170 in the reset state.

In the interface circuit 170 of the information processor of the present embodiment, when a reset signal is inputted via the reset signal line 401, the internal state of the interface circuit 170 is initialized and is kept in an inoperative state while the reset signal is being inputted.

Consequently, in the interface circuit 170 of the information processor of the embodiment, when there is kept the state in which the reset signal is inputted via the reset signal line 401, the interface circuit 170 is kept in the reset state, i.e., in the state of the low consumption power mode.

As above, when the interface circuit 170 of which the consumption power mode is desired to be changed by the change circuit 180 does not include the sleep mode transition enable signal line 320, the consumption power mode is changed by using the reset signal line 401.

As described above, in accordance with the information processor of the embodiment shown in FIG. 4, the consumption power is controlled by the reset signal, and hence, it is possible to control the consumption power of the digital communication line interface circuit not having no power source line or mode signal line.

In the embodiment above, it may also be possible that the status register 201 is fabricated in an integrated circuit (IC) together with the link state detect circuit 171 such that the link output therefrom is internally connected to the register input and the contents of the status register 201 are inputted from the IC to the CPU 110.

Figure 5:
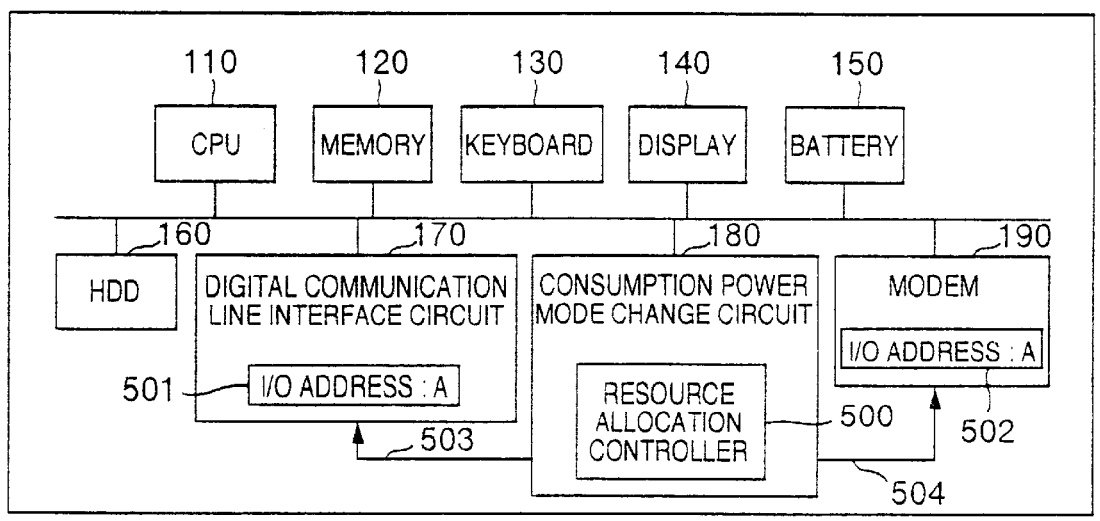
FIG. 5 is a diagram showing an outline of an operation of allocating resources when the consumption power mode is changed in the digital communication line interface circuit 170 of the information processor of further yet another embodiment.

Referring next to FIG. 5, description will be given of another embodiment of the information processor in which, when the consumption power mode of the interface circuit 170 is changed, the resource allocation is changed.

FIG. 5 is a diagram showing an outline of an operation to change the resource allocation when the consumption power mode of the interface circuit 170 in the information processor of the embodiment is changed. In FIG. 5, 500 indicates a resource allocation controller, 501 and 502 are I/O addresses, and 503 and 504 denote consumption mode control signal lines.

As shown in FIG. 5, in the operation to change the resource allocation when the consumption power mode of the interface circuit 170 is changed, there are used the allocation controller 500, the I/O addresses 501 and 502, and control signal lines 503 and 504. When a particular link state confirmation request is issued, the link state is confirmed by the link state detect circuit 171, and the consumption power mode of the interface circuit 170 is changed in accordance with the confirmed link state to change the allocation of resources to the interface circuit is 170. The resource allocation controller 500 changes allocation of the interruption signal, I/O addresses, and the like to the interface circuit 170 when the consumption power mode of the interface circuit 170 is changed.

In this configuration, it is assumed that the interface circuit 170 used the I/O address 501 as the resource and the modem 190 uses the I/O address 502 as the resource. The mode change circuit 180 controls the consumption power of the interface circuit 170 and modem 190 via the consumption power mode control signal lines 503 and 504 and each of these components is initially in the power-off state.

When the link state detect circuit 171 is activated at occurrence of a particular link state confirmation request and a link establishing event is confirmed by the status register 201 within a fixed period of time thereafter, the mode control signal line 503 is kept in the power supply state to activate the interface circuit 170. In this situation, "A" is allocated as the resource, i.e., I/O address 501 to the interface circuit 170, and is therefore utilized as the I/O address 501 during the operation of the interface circuit 170.

Additionally, in the polling operation for the fixed period of time, when the link establishing event is not confirmed by the status register 201 within the fixed period of time, the power supply to the signal line 503 is stopped to terminate the operation of the interface circuit 170. When the operation of the interface circuit 170 is terminated, "A" of the I/O address 501 is set to the unused state.

In this state, when a use request is issued to the modem 190, the resource allocation controller 500 supplies power to the consumption power mode control signal line 504 of the modem 190 so that the address "A" allocated as a resource to the interface circuit 170 is used as the I/O address 502 of the modem 190.

As described above, in accordance with the information processor of the present embodiment, since the resource allocation is changed when the consumption power mode is changed, the resources of the information processor can be efficiently utilized.

Next, referring to FIGS. 6 to 8, description will be given of embodiments of the information processor in which a modem circuit of the computer system of the present invention has compatibility with respect to conventional apparatuses conducting equivalent operations, and power of the modem circuit can be turned off to minimize power consumption of the modem circuit.

An outline of the embodiments of the invention will be described. As shown in FIG. 6, a power saving controller of a modem according to one embodiment includes a microprocessor 601, a bus 603, a bus bridge 602, an access detection circuit 604 to monitor a state of accessing from software to a serial interface circuit, a timer circuit 614 to determine that the access to a modem is not conducted for a fixed period of time, and a power supply control circuit 617 to power the modem circuit on or off on the basis of a result from the timer circuit 614. There is provided a signal to mask a transmission enable signal 627A to notify a serial interface circuit 607 that the mode cannot be used when the modem circuit 607 is not being powered and a mask circuit 611.

Figure 7:
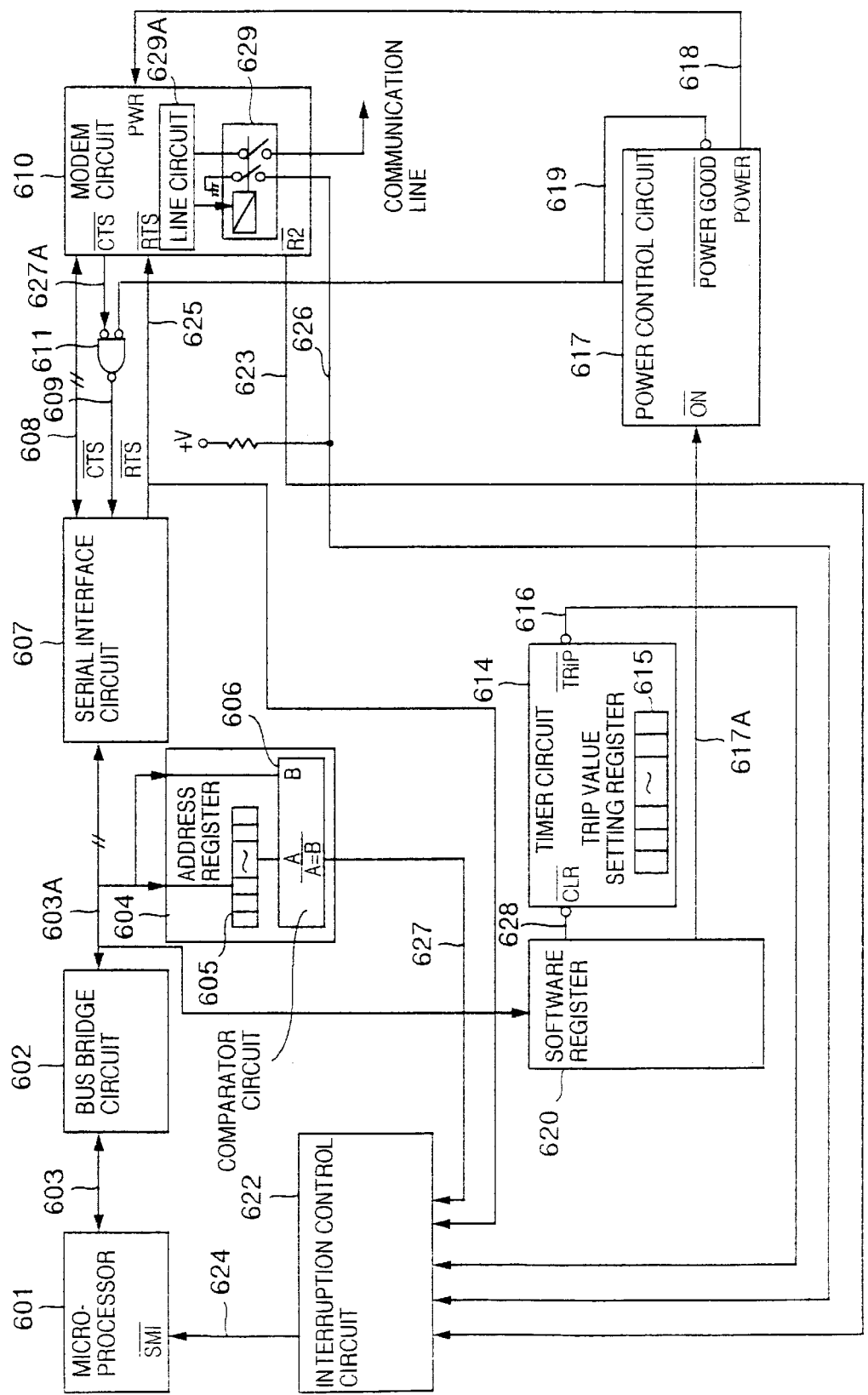
FIG. 7 is a block diagram showing an embodiment of an information processing apparatus including an energy saving mechanism of a software-implemented modem circuit in accordance with the present invention.

In an apparatus of another embodiment, as shown in FIG. 7, results and the like from an access detection circuit 604, a communication line busy signal 626, and a timer circuit 614 are combined with each other by power saving software operating on a micro-processor 601 to control a power supply control circuit 617 on the basis of the results by the power saving software operating on microprocessor 601. Namely, there is positively employed software intervention. This resultantly simplifies the power saving circuit and improves the degree of freedom of the control method.

Next, the present embodiments will be described in detail.

Figure 6:
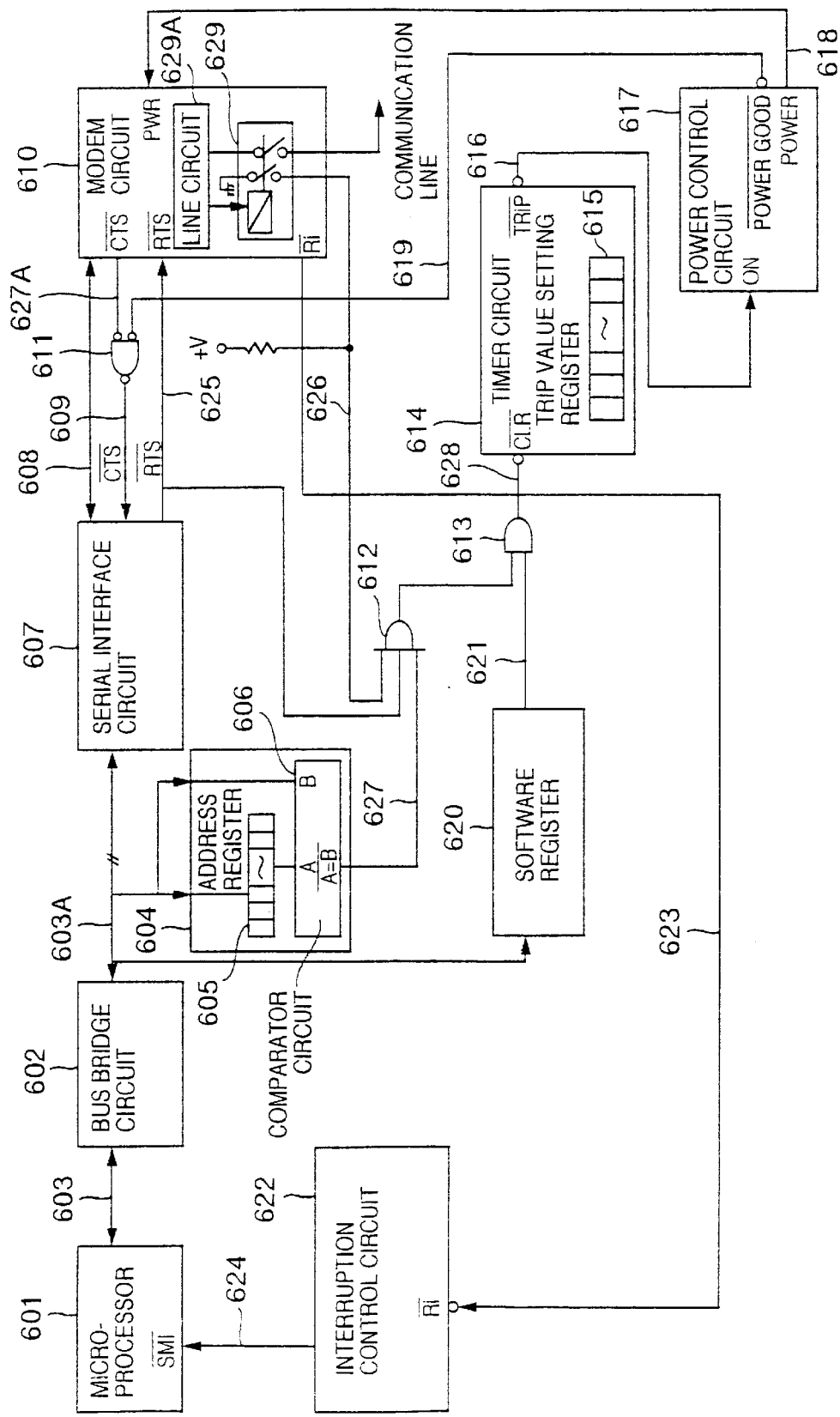
FIG. 6 is a block diagram showing an embodiment of an information processing apparatus including an energy saving mechanism of a hardware-implemented modem circuit in accordance with the present invention.

First, in a preferred embodiment, for an access of modem control software to the interface circuit 607, an address of the circuit 607 is compared with an address of an interface bus 603 3 in the access detection circuit 604 via the interface bus 603A to detect whether or not a modem circuit 610 is in use, as shown in FIG. 6. In the circuit 604, the address to be compared by a comparator 606 can be changed by an address register 605 to cope by programs with the address to which the serial interface is allocated. If the address of the interface circuit 607 is fixed, when the comparison address of the register 605 can cover all accesses to the interface 607, it is unnecessary to provide the programmable address register 605.

In addition to the access detection circuit 604 above, there exists means for detecting the state in which the mode is in use, namely, the means monitors a modem transmission request signal 625 included in the modem interface signals to determine that the modem circuit 610 is in use also when the signal is effective. In addition, when a communication line relay 629 connected to a line circuit 219A and included in the modem circuit 610 is in operation, the modem circuit is using the communication line and hence the modem circuit 610 indicates via a communication line busy signal 626 that the modem circuit 610 is in use.

It is unnecessary to provide all of these signals to detect or to determine the busy state. Namely, if the busy state can be appropriately judged by either one of the signal and/or a combination of the signals, it is possible to remove unnecessary detection and judge signals.

An access detection signal 627 from a comparator output $\overline{A=B}$ of the access detection circuit 604, the modem transmission request signal 625, or the communication line busy signal 626 is inputted as a modem circuit busy signal 628 to the timer circuit 614 via logic circuits 612 and 613, which produce a signal indicating the busy state or an access detection state.

When the busy signal 627 is not set to remain in a state indicating the busy state for a fixed period which is set by a trip value setting register 615, the timer circuit 614 assumes that the modem circuit 610 is not being used and outputs a modem circuit power-off request signal 616. Receiving the signal 616 from the timer circuit 614, the power supply control circuit 617 turns off power to a power supply line 618 of a modem circuit 610.

To notify the serial interface that the modem is unavailable in the power-off state, the control circuit 617 changes a power-off signal 619 to an off state and a transmission enable signal 609 to a disable state by the mask circuit 611.

Moreover, when the trip value is fixed, the trip value setting register 615 included in the timer circuit 614 is not required to be a register to be accessed from the software.

Additionally, when there is required a function in which the power saving mechanism is set to the unused state and the mode circuit 610 is kept powered, there may be provided a function in which an operation to continuously power the circuit is softwarewise $\overline{A=B}$ written in the software register 620 such that a continuous use signal 621 is outputted as a result of the operation, to thereby notify by the logic circuit 613 the continuous use state to the timer circuit 614.

Furthermore, the power-off signal 619 of the control circuit 617 indicates not only the state of the power supply line 618. Namely, when the modem circuit 610 cannot operate for a fixed period time even when powered form the supply line 618 (18), the signal 619 may be kept in the off state from when the modem circuit 610 is powered to when the modem 610 becomes operable within the fixed period of time.

Referring next to FIG. 6, description will be given of an operation to again power the modem circuit 610.

When the modem control software operating on the microprocessor 601 issues an access to a modem, the access detection circuit 604 detects the access to the interface circuit 607, and then an access signal 627 is changed to an access state. As a result of the transition of the access signal 627 to the access state, the timer circuit 614 is cleared by a modem busy signal 628 via the logic circuits 612 and 613 such that the modem power-off request signal 616 is resultantly released. Therefore, the power control circuit 617 starts powering the supply line 618 to the modem circuit 610. Awaiting for a fixed period of time in which the modem circuit 610 becomes operable, the circuit 617 changes the power-off signal 619 to the power-on state to thereby set the mask circuit 611 connected to the transmission enable signal 609. This enables the interface circuit to use the modem.

Since the transmission enable signal 609 from the modem circuit 610 is in the disable state from when the modem control software makes an access to the modem to when the modem circuit software makes an access to the modem to when the modem circuit 610 is again powered to an available state, transmission enable signal 609 from the modem circuit 610 is in the disable state, and the software assumes that the modem circuit 610 is preparing for transmission and hence enters a wait state. When a sequence of operations to power again the circuit are completed, the enable signal 609 is set to the enable state and the software can utilize the modem circuit 110.

An access of the modem control software to a serial interface circuit 607 is detected by an access detection circuit 604 via an interface bus 603. Moreover, conditions to judge all modem use conditions such as a modem transmission request signal 625 and a communication line busy signal 626 are connected to an interruption control circuit 622 such that when the signal state is changed, a system management interruption signal 624 is issued to microprocessor 601.

Due to the provision above, a conventional modem to which the present invention is not applied and the system above operate in an equivalent manner to each other when viewed from the modem control software, and hence there does not arise any problem for compatibility.

Referring next to FIG. 7, description will be given of another embodiment positively utilizing software intervention.

An access of the modem control software to a serial interface circuit 607 is detected by an access detection circuit 604 via an interface bus 603. Moreover, conditions to judge all modem use conditions such as a modem transmission request signal 625 and a communication line busy signal 626 are connected to an interruption control circuit 622 such that when the signal state is changed, a system management interruption signal 624 is issued to microprocessor 601.

Receiving the signal 624, the microprocessor 601 invokes management software of a timer circuit 614 to clear a timer included in the timer circuit 614.

When the modem circuit 610 is not accessed at all, the system management interruption occurring at an access to the modem circuit 610 does not occur, and hence the management software of the timer circuit 614 is not invoked and the timer included in the timer circuit 614 is not cleared.

In a case in which the timer circuit 614 is not cleared for a fixed period of time set by the trip value setting register 615, the timer circuit 614 issues a power-off request signal 616 to the interruption control circuit 622.

Therefore, the circuit 622 issues the system management interruption signal 624 to the microprocessor 601, and then the microprocessor 624 invokes modem power management software.

The software causes the power control circuit 617 to change via a software register 620 a modem power-off request signal 617A to a power-off request state to thereby stop the power supply to the modem circuit 610.

If the modem control software makes an access to the modem circuit 610 when the power supply of the modem circuit 610 is stopped, the access is detected by the access detection circuit 604 and the management software of the timer circuit 614 is invoked via the interruption control circuit 622 to clear the timer included in the timer circuit 614.

Resultantly, the timer circuit 614 issues the power-off request signal 616 to the control circuit 622 to thereby invoke the power management software such that the software causes the power control circuit 617 to change via the software register 620 the power-off request signal 617A to a power-on state so as to supply power to the modem circuit 610.

As described above, in accordance with the method of FIG. 7, the software intervention is employed partially in the control operation, which makes it possible to simplify the hardware logic circuit and to provide a degree of freedom at the same time.

Additionally, when the modem circuit 610 receives a terminating call request from the communication line in the state in which the power of the modem circuit 610 is being stopped, a terminating call request reception signal 623 is set to a terminating call state, and the signal is issued to the interruption control circuit 622 such that the circuit 622 issues the system management interruption signal 624 due to reception of the reception signal 623 at the microprocessor 601. As a result, an access or the like to the modem circuit 610 is conducted by the interruption processing program operating on the microprocessor 601 to power again the circuit 610 and, hence, the modem circuit 610 can issue a response to the terminating call request received from the communication line.

Furthermore, when a sequence of processing is completed for the terminating call request, a modem circuit busy signal 628 is not changed to the busy state for the timer circuit 614; therefore, the power of the modem circuit 610 is automatically stopped when a period of time indicated by the trip value setting register 615 in the timer circuit 614 lapses thereafter.

In addition, there is a method in which the system management interruption is not used, i.e., the reception signal 623 above is provided as a condition not for the interruption control circuit 622, but for the modem circuit busy signal 628 for the timer circuit 614.

Furthermore, the circuit to generate the reception signal 623 only monitors a voltage level or the like of the communication line and, hence, is operable also when the modem circuit 610 is not powered. However, it may also be possible that only a portion of the modem circuit is separated from the circuits powered by the supply line 618.

Additionally, for the relay 629, there may be used an insulating relay including semiconductors other than the electromagnetic relays, depending on circumstances.

Moreover, the present circuit need not be provided in a system which does not require the response operation to the terminating call request signal.

Figure 8:
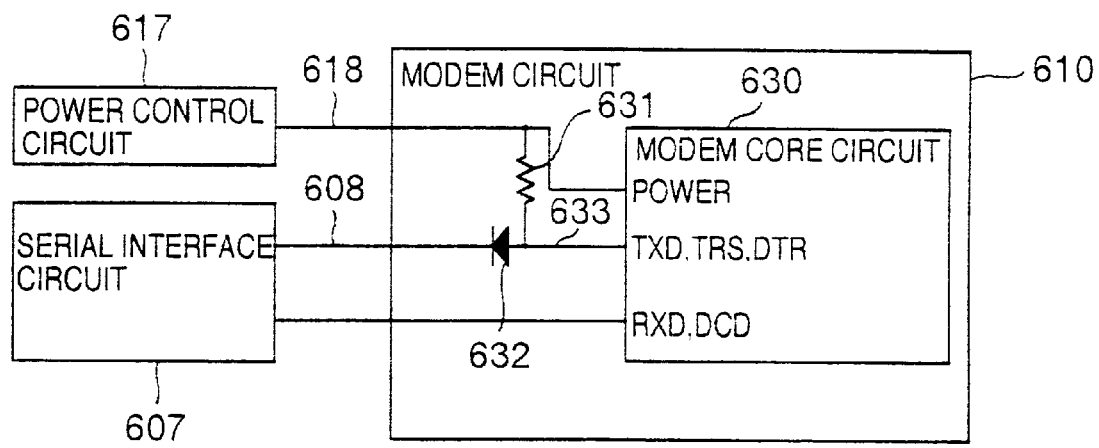
FIG. 8 is a block diagram showing the configuration of an embodiment to prevent current from flowing from a modem control circuit in accordance with the present invention.

Next, FIG. 8 shows an embodiment of a modem in which, when the power of the modem circuit 610 is stopped by the control circuit 617, a signal current from the interface circuit 607 is prevented from flowing via an interface bus 609 into a modem core circuit 630.

When the control circuit 617 stops the power of the supply line 618 of the modem circuit 610, the potential of an interface bus 608 becomes lower than that of a modem core circuit bus signal 633; therefore, the signal 633 is electrically disconnected from the bus 108 by a diode 632.

When the control circuit 617 supplies power to the supply line 618 of the modem circuit 610, the potential of the bus signal 633, when compared with the potential of the bus 608, becomes higher than that of the bus 608 due to a current flowing from a resistor 631, and hence the diode 632 is electrically connected therebetween so that the interface circuit 607 transmits data and control signals to the modem core circuit 630.

In accordance with the present embodiments, when the modem circuit is in an unused state, it is possible to stop the power of the modem circuit while keeping compatibility. It is therefore possible to minimize the consumption power of the information processor such as a battery-driven hand-held personal computer in which the consumption power is minimized, for example, more than 30% as compared with the conventional examples.

While the present invention has been specifically described in accordance with the embodiments above, it is not to be restricted by those embodiments, and the embodiments can be variously modified without departing from the scope and spirit of the present invention.

What is claimed is:

1. An information processing apparatus capable of connecting or including a modem thereto or therein, comprising:

a signal line disposed in the modem for notifying the information processing apparatus that a communication line is busy;

a modem power on-off circuit for turning power of the modem on and off at a desired point of time; and a mask circuit for forcibly setting a transmission enable signal of the modem to a disable state, wherein:

the power of the modem is turned off in accordance with a state of the signal line indicating that the communication line is busy and consumption power of the information processing apparatus is thereby minimized; and during a period of time in which the modem power is turned off for the minimization of consumption power and during a period of time from when the modem is powered to when the modem is completely initialized to normally conduct signal transmission and reception, the mask circuit is controlled to forcibly set the transmission enable signal of the modem to the disable state to avoid an erroneous data transmission to the modem, thereby preventing loss of the transmission data.

2. An information processing apparatus according to claim 1, further including a serial interface circuit as a connection interface between the modem and the information processing apparatus, wherein a transmission request signal to the modem of the interface circuit and a signal outputted from the modem to indicate that the communication line is busy are monitored and the modem power is turned off to minimize the consumption power when it is detected that the modem is not used for a predetermined period of time.

3. An information processing apparatus according to claim 1, further including:

a serial interface circuit as a connection interface between the modem and the information processing apparatus;

an access detector circuit for monitoring an access of the interface circuit; and a timer circuit for monitoring at least a signal indicating that the communication line is busy or a transmission request signal of the interface circuit to the modem and detecting that the modem is not used at least a fixed period of time, wherein the modem power is turned off to minimize the consumption power when the timer circuit detects that the modem is not used for a predetermined period of time.

4. An information processing apparatus according to claim 1, further including:

a serial interface circuit as a connection interface between the modem and the information processing apparatus; and a detector circuit for monitoring an access of the interface circuit, wherein at least one selected from a signal indicating that the communication line is busy and a transmission request signal of the interface circuit to the modem is monitored and the modem power is turned off when it is detected that the modem is used.

* * * * *

UNITED STATES PATENT AND TRADEMARK OFFICE
CERTIFICATE OF CORRECTION

PATENT NO.    : 6,772,353 B2
DATED         : August 3, 2004
INVENTOR(S)   : Yosuke Konaka et al.

It is certified that error appears in the above-identified patent and that said Letters Patent is hereby corrected as shown below:

<u>Title page,</u>
Item [75], Inventors, replace the currently inventor names "Yosuke Konaka, Ebina (JP); Yoshiaki Nomura, Ebina (JP); Shigeharu Koyanagi, Sagamihara (JP); Nobuhiro Kato, Ebina (JP)" with the folowing -- Yosuke Konaka, Machida (JP); Hirotsugu Ohnishi, Ebina (JP); Giichirou Yokokura, Ebina (JP); Kazumi Kubota, Tokyo (JP) --.

Signed and Sealed this

Twenty-fifth Day of October, 2005

JON W. DUDAS
*Director of the United States Patent and Trademark Office*